US006106784A

United States Patent [19]

Lund et al.

[11] Patent Number: 6,106,784

[45] Date of Patent: *Aug. 22, 2000

[54] THAWING STATION

[75] Inventors: Kurt O. Lund, Del Mar; Yves Theriault, San Diego, both of Calif.

[73] Assignee: Applied Chemical & Engineering Systems, Inc., Del Mar, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,029

[22] Filed: Sep. 26, 1997

[51] Int. Cl.[7] .................... G01N 1/00

[52] U.S. Cl. .................... 422/104; 422/102; 422/109; 435/303.1; 436/174; 219/428; 219/429; 219/433

[58] Field of Search .................... 422/99, 102, 104, 422/68.1, 95, 101; 436/174, 181, 183; 435/303.1, 809; 219/428, 429, 430, 433

[56] References Cited

U.S. PATENT DOCUMENTS

| | | | |
|---|---|---|---|
| 3,556,731 | 1/1971 | Martin | 422/65 |
| 4,116,777 | 9/1978 | Takatsy et al. | 195/127 |
| 4,208,574 | 6/1980 | Schafer | 219/539 |
| 4,859,420 | 8/1989 | Schultz | 422/58 |
| 4,877,134 | 10/1989 | Klein | 206/443 |
| 4,919,894 | 4/1990 | Daniel | 422/104 |
| 4,950,608 | 8/1990 | Kishimoto | 435/290 |
| 5,038,852 | 8/1991 | Johnson et al. | 165/12 |
| 5,061,630 | 10/1991 | Knopf et al. | 435/290 |
| 5,073,346 | 12/1991 | Partanen et al. | 422/99 |
| 5,096,672 | 3/1992 | Tervamaki et al. | 422/102 |
| 5,100,623 | 3/1992 | Friswell | 422/68.1 |
| 5,158,132 | 10/1992 | Guillemot | 165/30 |
| 5,435,378 | 7/1995 | Heine et al. | 165/64 |
| 5,459,300 | 10/1995 | Kasman | 219/433 |
| 5,504,007 | 4/1996 | Haynes | 435/285.1 |
| 5,525,300 | 6/1996 | Danssaert et al. | 422/99 |
| 5,601,141 | 2/1997 | Gordon et al. | 165/263 |
| 5,604,130 | 2/1997 | Warner et al. | 435/286.7 |
| 5,705,062 | 1/1998 | Knobel | 210/205 |

*Primary Examiner*—Long V. Le

*Attorney, Agent, or Firm*—Fulwider Patton Lee & Utecht, LLP

[57] ABSTRACT

A heating device for a titration plate enables selected sample wells to be thawed by providing an array of individually energizable heat sources each capable of heating a single sample well. A cold plate serves to maintain all other samples in their frozen state.

26 Claims, 7 Drawing Sheets

THAWING STATION

BACKGROUND OF THE INVENTION

The present invention generally relates to a heater for titration plates and more particularly pertains to a heating device that is capable of exclusively thawing the contents of individually selected sample wells within a titration plate.

Titration plates are commonly employed in laboratory work of various disciplines to store multiple samples, typically in a closely spaced 8×12 pattern of sample wells. The titration plate is often of monolithic construction and may comprise a single injection molding of a chemically inert plastic material. Each individual well extends downwardly from the flat top face of the plate, is typically cylindrical in cross-section and is provided with a flat, U-shaped or V-shaped bottom to support a sample volume of 1 ml.

Titration plates offer a convenient means for processing large numbers of samples such as, for example, when used in a screening process, a statistical analysis or a large-scale assay project. It is often necessary to maintain the titration plate in a frozen state in order to preserve or stabilize the contents of the individual sample wells. A distinct disadvantage inherent in the use of the described titration plate becomes apparent when only one or just a few, or in fact any number less than all of the frozen sample wells need to be accessed. In order to do so, it has previously been necessary to thaw out the entire titration plate including all of the samples contained therein. After extraction of the desired sample, the rest of the samples are refrozen for future use. This process can have a detrimental effect on such samples as the residence time in their thawed state is extended while the thermal cycling and repeated phase changes can pose additional problems. Handling, while in the thawed state, also increases the risk of spillage and contamination.

While thawing is typically accomplished by simply removing the titration plate from the freezer and allowing the ambient temperature in the laboratory to warm up the samples, heating devices have been previously devised to expedite the thawing. The amount of time the samples are in their unfrozen state may be somewhat reduced thereby, but the samples are still subjected to the potentially detrimental thermal cycling and phase changes. A simple hot plate fulfills the most fundamental requirements while the more sophisticated heating devices include features that endeavor to maintain as uniform a temperature as possible throughout the entire array of samples contained in the titration plate. Additionally, heating devices are known that subject the entire array of sample wells in a titration plate to a prescribed temperature gradient as is useful for any of a variety of analytical purposes.

The prior art is devoid of a device that is capable of facilitating access to an individual sample well of a titration plate without disturbing the frozen state of those sample wells that are not to be accessed.

SUMMARY OF THE INVENTION

The present invention provides a heating apparatus that is capable of thawing the contents of selected individual sample wells within a titration plate without thawing the contents of adjacent sample wells. Thus, the contents of individual sample wells can therefore be sampled or completely removed without causing the other samples contained in the same titration plate to become unfrozen and thereby degraded.

Preferred embodiments of the present invention may include an array of sleeves that are arranged and dimensioned to individually receive each of the sample wells of a titration plate placed thereover. Such sleeves may serve to direct or conduct heat to the well received therein and may optionally be relied upon to conduct heat away from the vial when not in the heating mode. Alternatively, the sleeves may be relied upon to merely properly position sample wells inserted thereinto relative to a source of conducted, convected or radiated heat. As a further alternative, the selective heating may be accomplished without the use of individual well receiving sleeves.

In a preferred embodiment, an array of thermally conductive sleeves extend upwardly from a cold plate which serves to conduct heat away from each sample well via the corresponding sleeve. Each sleeve is additionally fitted with an individually controllable heating element. By energizing such heating element, the thermally conductive sleeve conducts heat to the corresponding sample well to thaw out the material contained therein. Adjacent sample wells are unaffected by the heat generated by the energized heating element and continue to be maintained in their frozen state by virtue of their continued interconnection to the cold plate via their corresponding sleeves. Optionally, the sleeve is physically disconnected from the cold plate upon energization of the corresponding heating element to minimize heat loss and thereby expedite the thawing process. A programmable controller is employed to enable an operator to select those heating elements which are to be energized.

In alternative embodiments, the exterior surface of each sample well is coated with a resistive material and the sleeve serves to conduct electricity thereto. As a result heating is effected on the well itself. Alternatively, each sleeve is in direct contact with an individually controllable Peltier-effect device with which both the heating as well as cooling of each well is accomplished. As a further alternative, a source of radiant energy such as a laser is focused on each well wherein selective energization thereof serves to heat selected sample wells. Finally, the sleeve may be relied upon to direct a flow of heated fluid at each well to effect a thawing thereof.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

The device of the present invention is used to thaw material contained in selected individual sample wells of a titration plate while maintaining the balance of the samples in their frozen state. Upon thawing and after removal or sampling of the material contained within a particular sample well, the titration plate can be returned to frozen storage without having disturbed the other samples. Optionally, the thawed and sampled materials may first be refrozen in the thawing device, prior to its return to cold storage.

Figure 1:
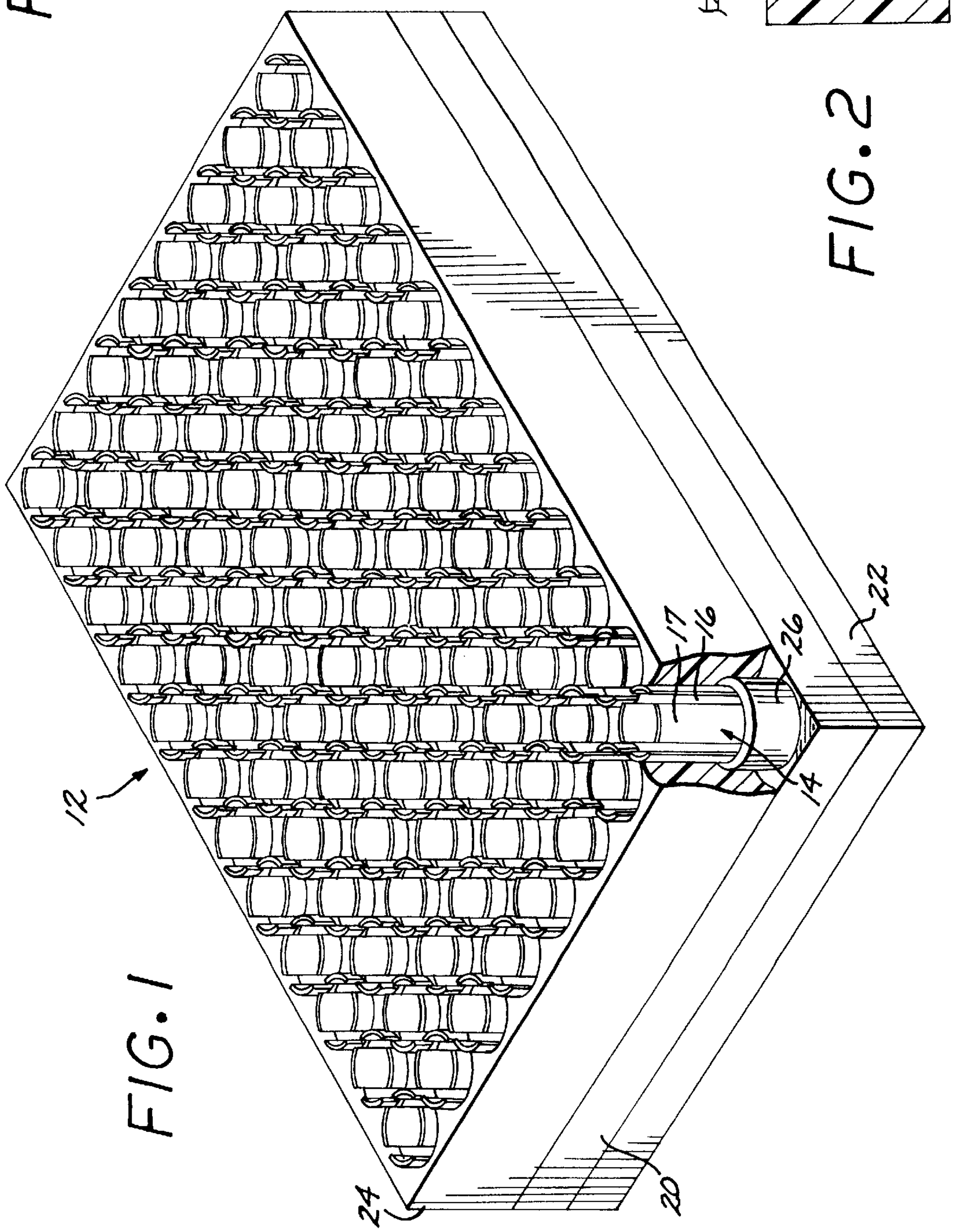
FIG. 1 is a partially cut back perspective view of the thawing device of the present invention.

FIG. 1 is a perspective view of a preferred embodiment 12 of the present invention. The particular embodiment shown comprises a heating device 12 which accommodates a titration plate having 96 sample wells arranged in an 8×12 pattern, with 9 mm on-center spacing. A different titration plate configuration would require a correspondingly configured heating device. The device supports an array of individual sleeves 14 that are dimensioned and arranged to receive the individual sample wells extending downwardly from a titration plate. Each sleeve is slotted 16 to accommodate reinforcing webs in the titration plate, and which in concert with the inherent resiliency of the material from which the sleeve is formed, enables the fingers 17 defined by the sleeve to act as leaf springs and to in effect grasp a sample well 18 inserted thereunto. In an effort to ensure that uniform contact pressure is exerted by the sleeve or fingers on the length of a sample well inserted thereinto, the distal end of each finger is curved slightly inwardly (1/32") in accordance with elementary beam theory. In this particular embodiment, each sleeve serves to conduct heat to and from the individual well received therein and due to the commensurate thermal conductivity and resiliency requirements, the sleeves are preferably formed of beryllium-copper alloy which is a widely used material for applications requiring good thermal or electrical conductivity, and good resiliency. Other preferred materials are nickel and aluminum alloys.

Each sleeve is in intimate and therefore thermal contact with a cold plate 20 situated therebelow that spans the entire device. Heat is actively removed from the cold plate, preferably by electronic means such as by a Peltier effect device or by more conventional means such as by the circulation of refrigerated coolant therethrough. The entire assembly is supported on a thermally insulative base 22 which may be furnished with a non-slip bottom surface.

Figure 2:
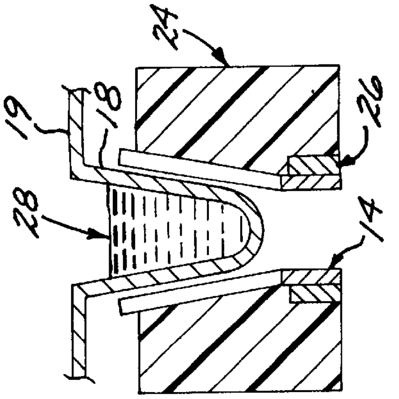
FIG. 2 is a cross-sectional view of an individual sample well received within a portion of the thawing device of the present invention.

As is visible in FIG. 2, surrounding each sleeve is a mass of thermally insulative material 24 such as an elastomer, which not only serves to thermally isolate the various sleeves and hence sample wells from one another, but may additionally be relied upon to provide additional resilience to the slotted portion of the sleeves to thereby enhance the grasping force generated thereby. Fitted about the base of each sleeve is a heating element which is individually energizeable. In its simplest form, a 1–10 watt winding of resistance wire within an electrically insulated shell is disposed in thermal contact with the circumference of the sleeve.

Figure 3:
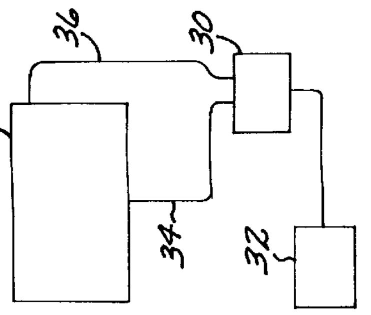
FIG. 3 is a schematic illustration of a complete heating system.

FIG. 3 illustrates the system as a whole wherein a programmable controller 30 allows an operator to select the individual heating elements that are to be energized via interconnection to the power source 32. Additionally, in the embodiment shown, the controller circuits power to the Peltier cooler contained within the cold plate via conduit 36.

Alternatively, the cooling function is regulated by controlling the function of a pump that circulates refrigerated coolant through the cold plate. The details associated with the programmable controlling of the flow of power to the individual heating devices and the cooler, as well as the details associated with satisfying the cooling requirements are well known to those skilled in the art.

Figure 4:
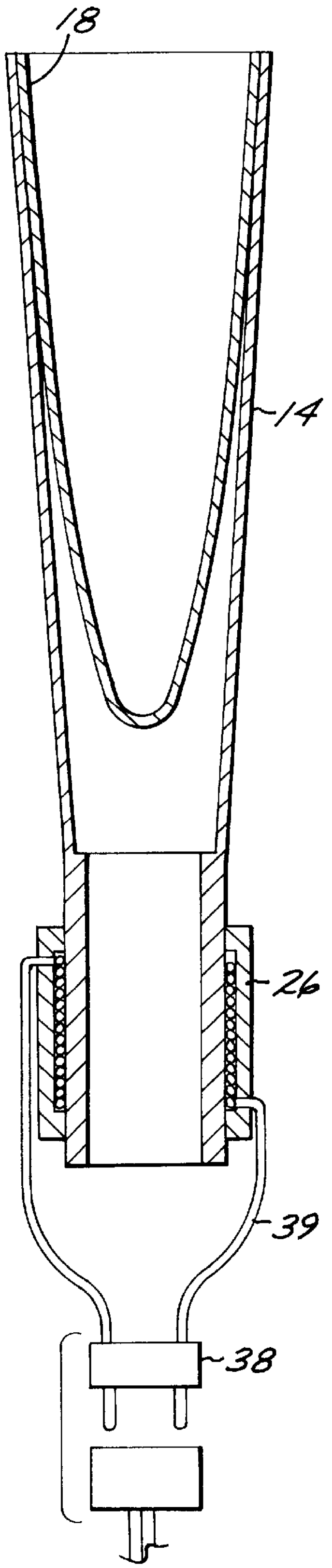
FIGS. 4–12 are semi-schematic representations of alternative embodiment heat source configurations.
Figure 5:
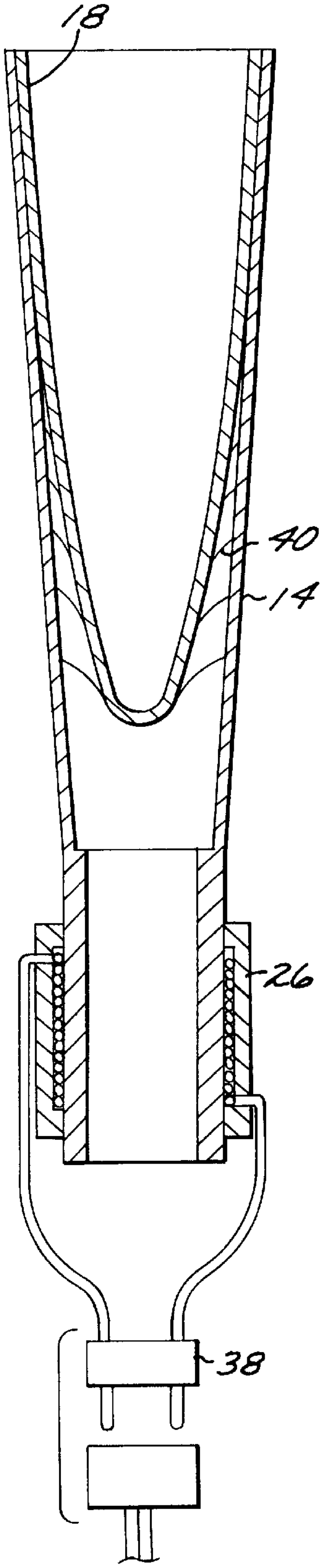
Figure 6:
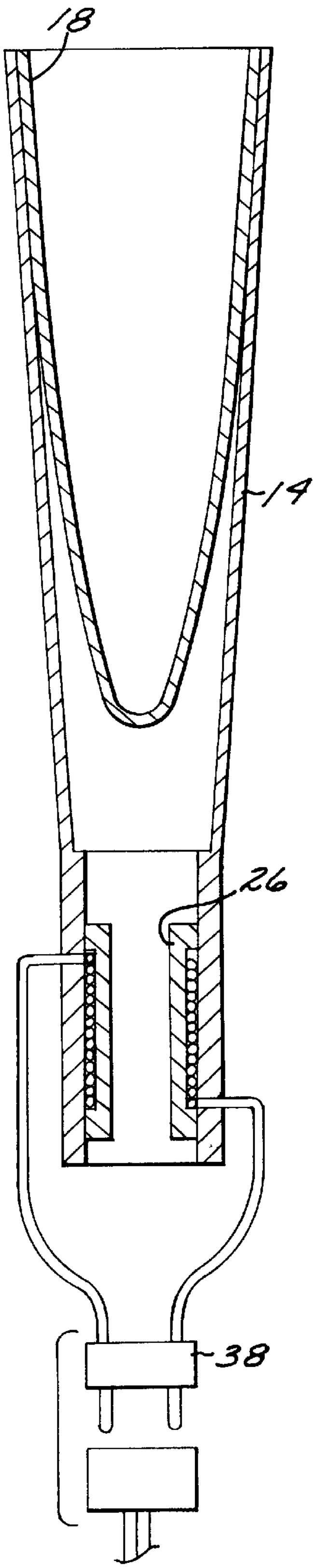

FIGS. 4–12, illustrate alternative embodiments that serve to exemplify a variety of different configurations by which an individual sample well is heatable in accordance with the present invention. The fact that the sleeves are shown making only marginal contact with the sample wells is for clarity only. In actuality, a substantial contact area is achieved. FIG. 4, is very similar to the configuration shown in FIG. 2 and additionally shows a connector 38 by which power is conducted to the heating element 26 and which facilitates replacement of the component in the event of failure. FIG. 5 illustrates the inclusion of fiber flock within sleeve 14 to facilitate heat transfer between the sample well 18 and sleeve 14. Material suitable for such use includes commercially available, high-conduction carbon fibers. FIG. 6 illustrates an alternative embodiment wherein the heater element 26 is fitted to the interior of sleeve 14. Such configuration provides for the more efficient use of heat generated by the heating element as substantially all heat radiated by the element is contained within the sleeve.

Figure 7:
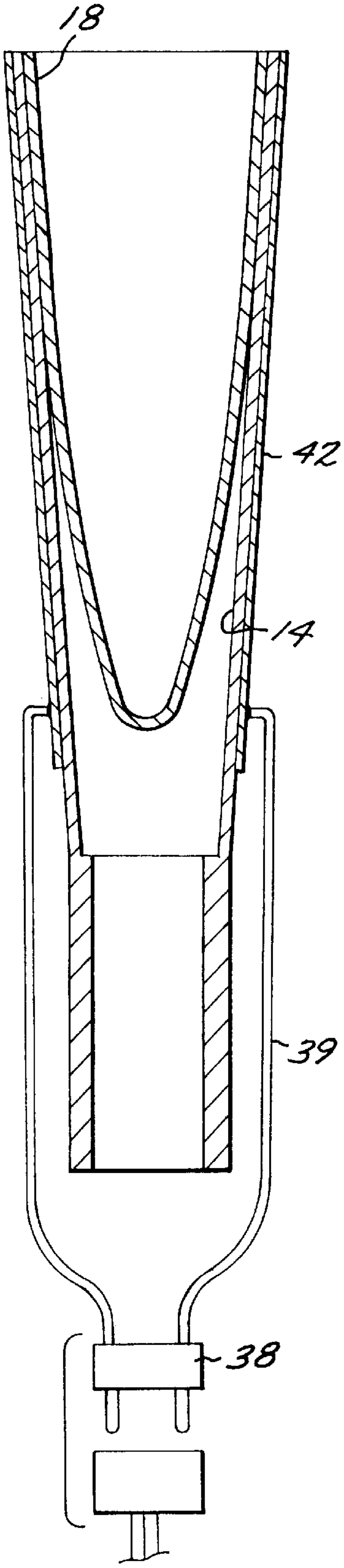
Figure 8:
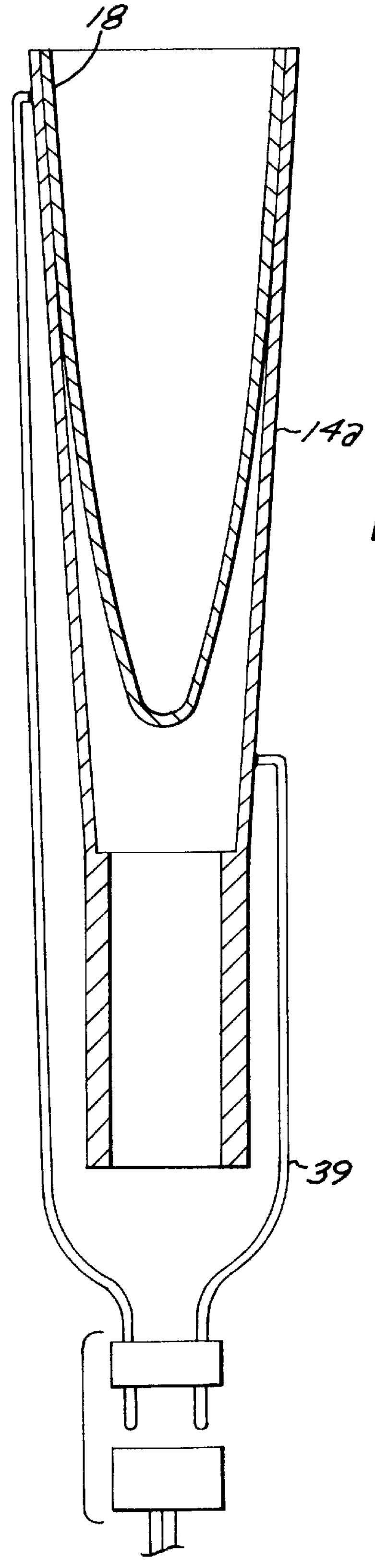
Figure 9:
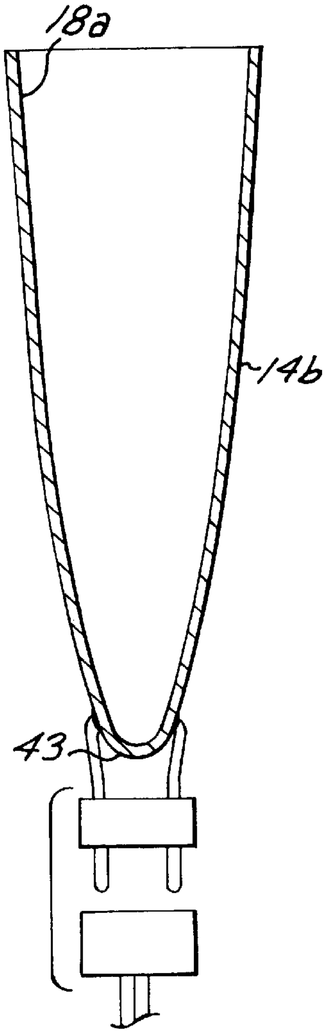

FIG. 7. illustrates an alternative embodiment wherein the sleeve 14 has a patterned heating foil 42 attached directly to its exterior surface. Conduits 39 are electrically interconnected to such foil. FIG. 8 provides an alternative wherein the sleeve 14*a* itself is formed of resistance material wherein energization via conduit 39 causes the sleeve to serve as the heating element. FIG. 9 illustrates an embodiment wherein the heating element 43 is coated directly onto the sample well 18*a* and wherein the sleeve 14*b* serves to conduct electricity to the coating. Energization thereof causes the sample well to heat up directly.

Figures 10, 11, 12:
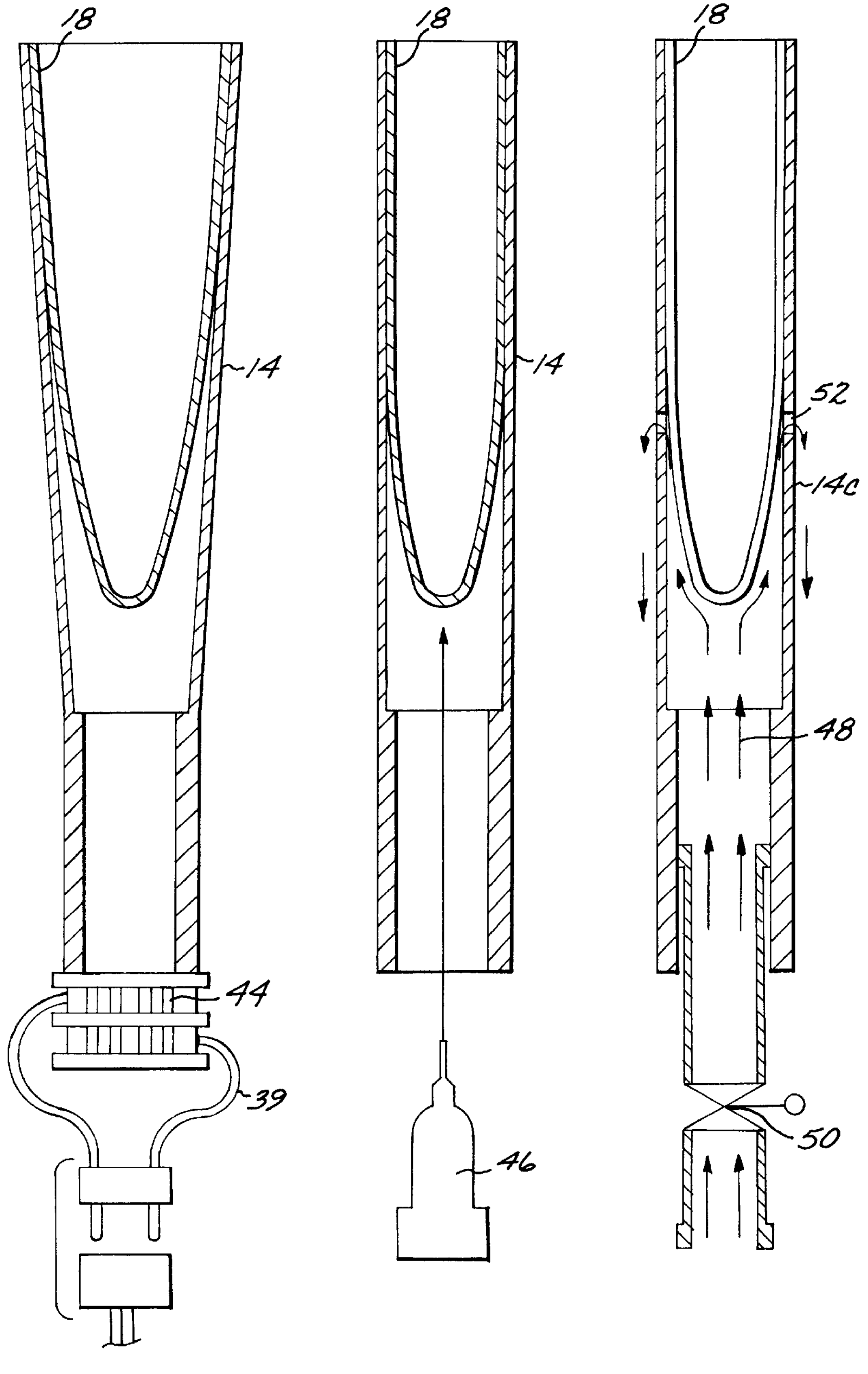

FIG. 10 illustrates an alternative embodiment wherein sleeve 14 is positioned in thermal contact with a Peltier device 44. Flow of current through conduits 39 in one direction causes the Peltier device to heat up while reversal of the flow of electrical current therethrough causes the Peltier device to cool. The selective cooling and heating of the various sample wells is thereby controlled by simply controlling the direction of current supplied to the various Peltier devices.

FIG. 11 illustrates an alternative embodiment wherein heating of the sample well 18 is accomplished by the absorption of radiant energy. A source of radiant energy such as a laser 46 is focused through the sleeve 14 so as to impinge on the sample well. The well may optionally be coated with absorbing material to enhance efficiency. The heating of a selected sample well may be accomplished by the selective energization of a corresponding laser, optical fiber or by the relative translational movement between the entire device 12 and a single laser.

FIG. 12 illustrates an alternative embodiment wherein the sample well is heated by convection in that the flow of a heated fluid 48, such as air, is directed at the sample well to effect the heating thereof. The flow of heated fluid is controlled by valve 50 and is emitted near the base of the sample well 18 within sleeve 14*c*. Flowing upwardly, the flow impinges on the sample well to effect a transfer of heat and subsequently escapes through port 52 in the sleeve 14*c*.

Figure 13:
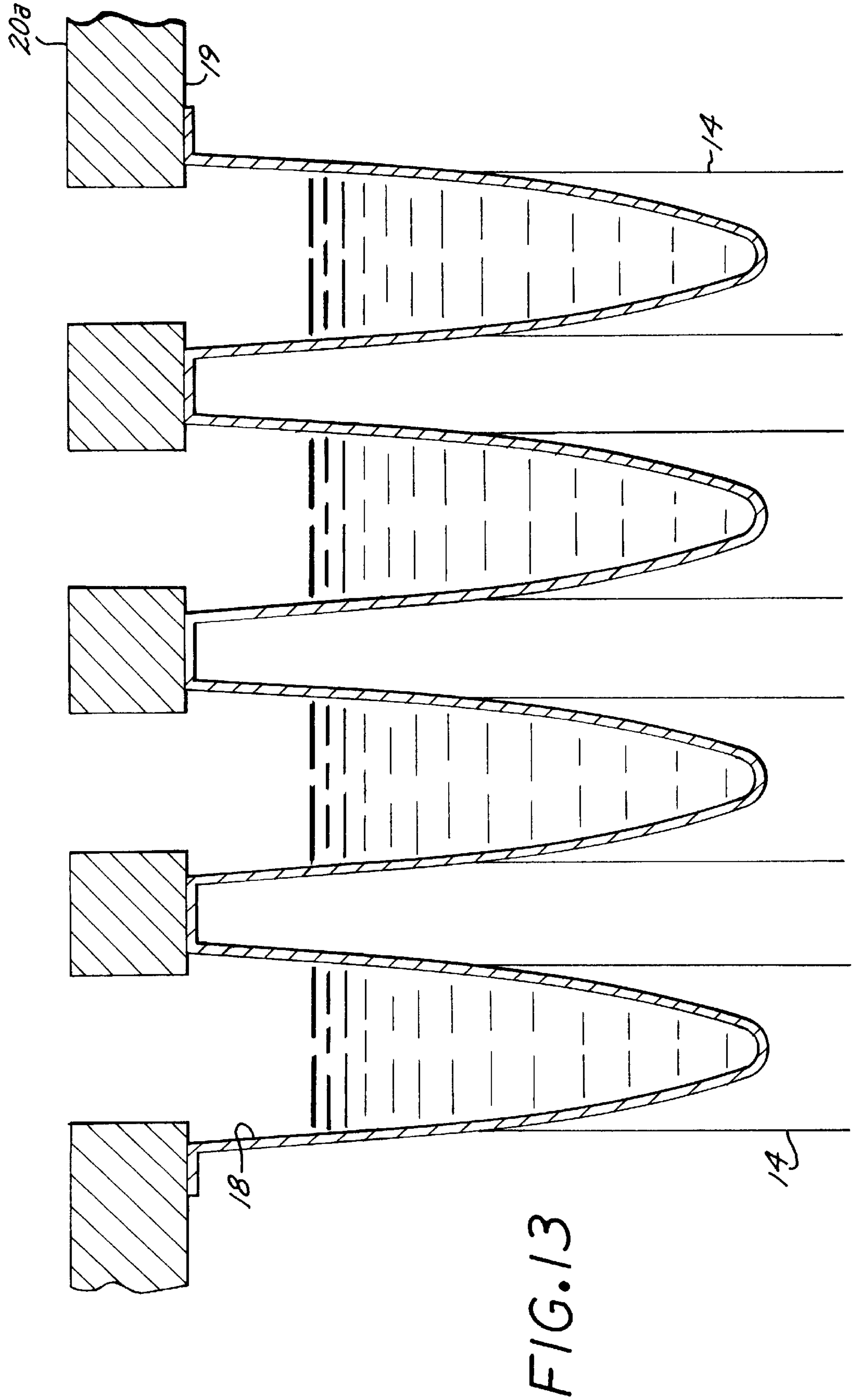
FIG. 13 is a cross sectional view of an alternative embodiment configuration.

As a further alternative to the particular configuration illustrated in FIG. 1, FIG. 13 provides for a cold plate 20*a* to be positioned above the titration plate 19. Heat is thereby transferred as it naturally rises above the sample wells 18.

Figure 14A:
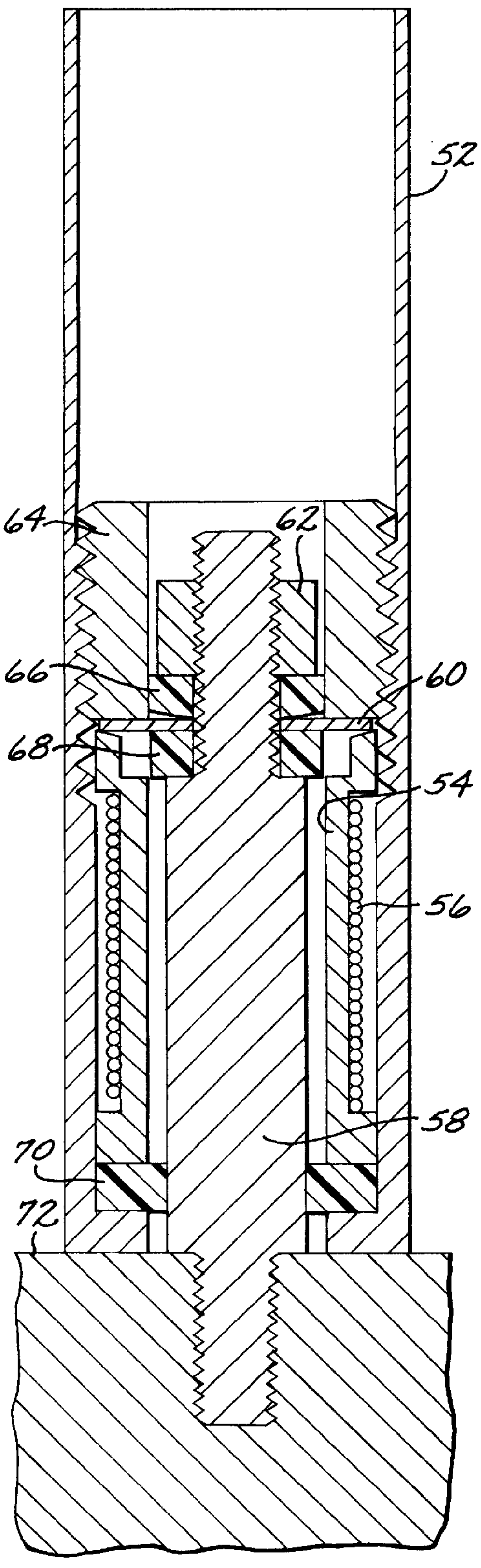
FIGS. 14*a* and *b* are cross-sectional views of an alternative embodiment incorporating a passive decoupling mechanism.
Figure 14B:
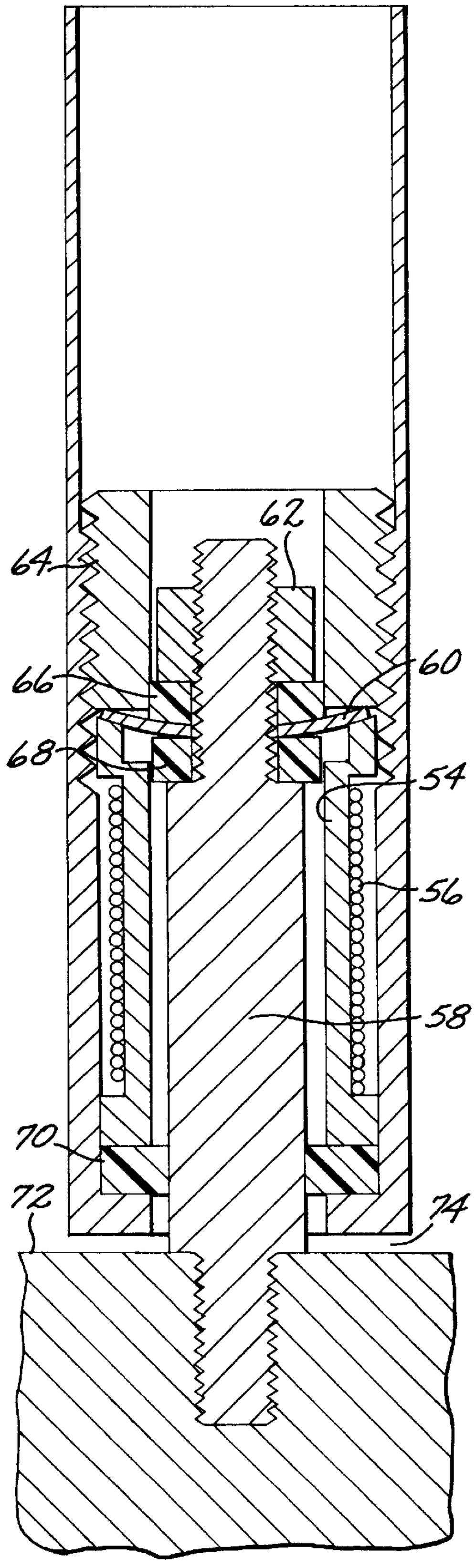

In alternative embodiments, a decoupling mechanism is associated with each sleeve. FIGS. 14*a* and *b* illustrate a configuration wherein the sleeve 52 and an internally disposed spool 54 of resistance wire 56 is slidably received on a support shaft 58. A bimetallic deflection disc 60 is rigidly affixed about the support shaft by a first nut 62 threaded thereunto. The periphery of the disc is attached to the sleeve by being sandwiched between the spool and a second nut 64. Insulating spacers 66, 68, 70 serve to thermally insulate the shaft from the sleeve. In its unactivated state shown in FIG. 14*a,* the bottom of the sleeve is in contact with the cold plate 72 situated therebelow. Upon energization of the resistance wire, the disc heats up (FIG. 14*b*), deflects and causes the sleeve to rise and become spaced apart (74) from the cold plate. Heat continuing to be generated by the resistance wire heats up the sleeve and a sample well received therein. Upon deenergization of the heating element, the bimetallic deflection disc cools to resume its original shape which causes the sleeve to be lowered back on to the cold plate which draws heat out of the sleeve and sample well to refreeze the sample.

Figure 15A:
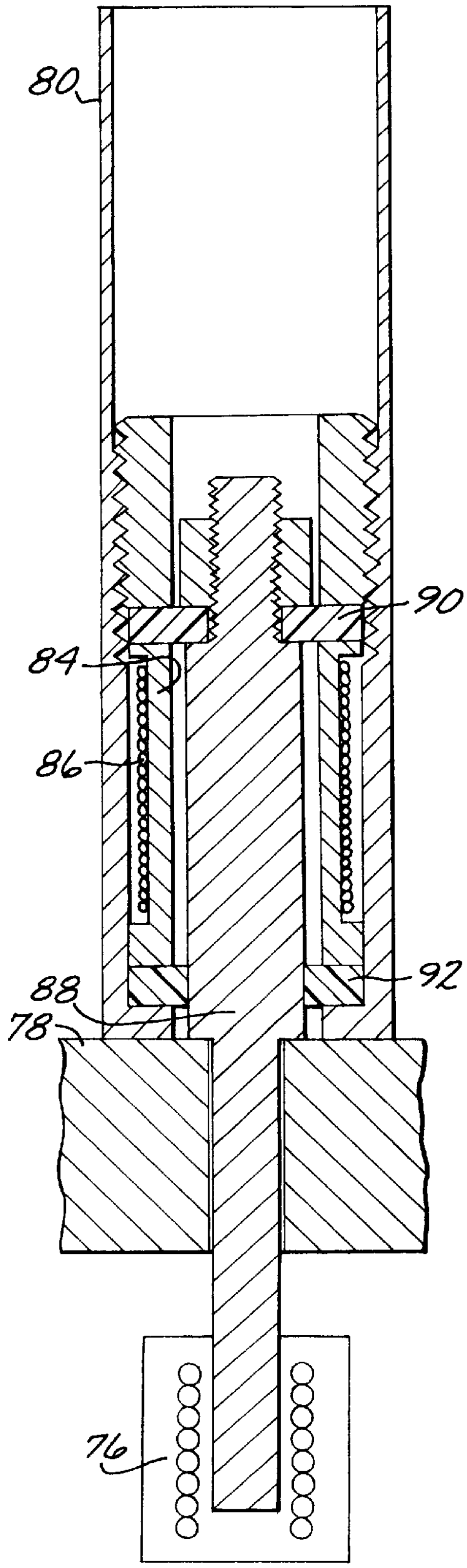
FIGS. 15*a* and *b* are cross-sectional views of an alternative embodiment incorporating an active decoupling mechanism.
Figure 15B:
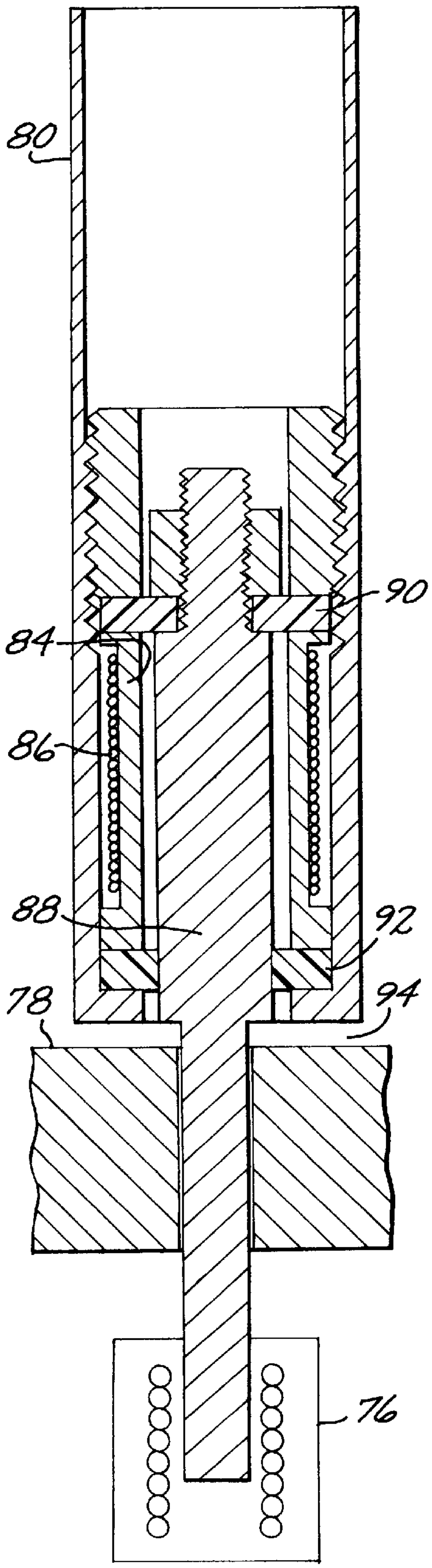

FIGS. 15*a* and *b* illustrate an active decoupling mechanism wherein a solenoid or other actuator 76 situated below the cold plate 78 lifts the sleeve 80 off of the cold plate upon activation. The sleeve and associated spool 84 of resistance wire 86 is rigidly affixed to a plunger 88 that extends from the solenoid through the cold plate. Insulating spacers 90, 92 serve to thermally insulate the plunger from the sleeve. In its unactivated state shown in FIG. 15*a,* the sleeve rests atop the cold plate to draw heat from the sleeve and any sample well received therein. Activation of the solenoid (FIG. 15*b*) causes the sleeve and associated heating element to lift off (94) of the cold plate and break thermal contact. The heating element may be simultaneously activated with the solenoid. Upon deactivation, the sleeve settles back down on to the cold plate to reestablish thermal contact therewith. As a further alternative, the solenoid windings may serve as the heat source, whereby deletion of insulation spacers 90, 92 would allow the plunger 88 to conduct heat to the sleeve 80. As yet a further alternative, the solenoid or actuator 76 may be located above the cold plate 78 or be integral with sleeve 80.

In operation, the titration plate 19 of frozen samples is placed on the top of the heating device 12 such that the individual sample wells 18 are received within the corresponding sleeves 14. The resiliency of the slotted configuration 16 of the sleeves and/or the resiliency of the surrounding elastomeric material 24 cause the sleeves 14 to make intimate contact with the sample wells 18 and hence thermal contact is achieved. After termination of heating, heat absorbed by an individual well in the titration plate and the sample contained therein is conducted to the cold plate 20 and removed by electronic cooling (Peltier effect) or by refrigerated coolant circulating there-through, thus refreezing the thawed samples. By virtue of the well and titration plate geometry, a greater portion of generated heat during thawing is absorbed in the material within the well than is absorbed in the cold plate 20.

The controller 30 is programmed by the operator to energize a selected heating element 26 or elements causing the temperature of the corresponding sleeve 14 to quickly rise. Optionally, the sleeve 14 is simultaneously decoupled from the cold plate to further expedite the thawing process. The heat conducted to the sample well 18 by the sleeve 14 causes the material 28 contained therein to melt. As soon as it attains a liquid state, it can be removed or sampled. Denergization of the heating element 26 causes the residual heat to be conducted away from the sample well 18 via the sleeve 14 to allow any remaining material to refreeze. Throughout this entire sampling process, the contents of all other sample wells remain undisturbed in a frozen state. Similar procedures are used to actuate the alternative heat sources described above. The controller may be subject to manual, analog, or numerical operation.

While a particular form of the invention has been illustrated and described, it will also be apparent to those skilled in the art that various modifications can be made without departing from the spirit and scope of the invention. For example, any of various heating means, including but not limited to those described and illustrated herein can be employed to selectively heat each sample well while any of various cooling means can be utilized to cool the samples. Accordingly, it is not intended that the invention be limited except by the appended claims.

What is claimed is:

1. A device for thawing selected sample wells of a titration plate having a plurality of sample wells arranged in a fixed array, comprising:

a fixed array of sleeves dimensioned and arranged to individually receive each of said sample wells in said titration plate; and individual, selectively energizable heat sources, each associated with a single sleeve and positioned so as to exclusively transfer heat to a single sample well upon being selectively energized, wherein any of said sample wells of a titration plate received by said fixed array of sleeves are selectively heatable without a shifting of said titration plate relative to said fixed array of sleeves.

2. The device of claim 1 wherein said sleeves are additionally thermally coupled to a heat sink.

3. The device of claim 2 wherein each of said sleeves is passively decoupled from said heat sink upon energization of its corresponding heat source.

4. The device of claim 2 wherein each of said sleeves is actively decoupled from said heat sink upon energization of its corresponding heat source.

5. The device of claim 1 wherein heat is transferred from said source to said sample wells via conduction.

6. The device of claim 5 wherein said heat source comprises a resistance heater in thermal communication with said sleeve.

7. The device of claim 1 wherein heat is transferred from said sources to said samples via radiation.

8. The device of claim 7 wherein said heat source comprises a laser.

9. The device of claim 1 wherein heat is transferred from said sources to said sample wells via convection.

10. A device for thawing selected sample wells of a titration plate having a plurality of sample wells arranged in a fixed array, comprising:

a fixed array of thermally conductive sleeves dimensioned and arranged to individually receive each of said sample wells of said titration plate; and individual, selectively energizable heating elements, each in thermal communication with only one of said sleeves, wherein any of said sample wells of a titration plate received by said fixed array of sleeves are selectively heatable without a shifting of said titration plate relative to said fixed array of sleeves.

11. The device of claim 10 wherein each of said sleeves is generally of cylindrical shape and wherein longitudinal slots are present therein.

12. The device of claim 11 wherein each of said sleeves are surrounded by resilient material so as to bias said sleeve inwardly and thereby grasp a sample well inserted thereinto.

13. The device of claim 10 wherein said sleeve is comprised of resilient material to enable said sleeve to grasp a sample well inserted thereinto.

14. The device of claim 13 wherein said sleeves are comprised of aluminum.

15. The device of claim 13 wherein said sleeves are comprised of a copper alloy.

16. The device of claim 13 wherein said sleeves are comprised of a nickel alloy.

17. The device of claim 10 wherein said heating elements each comprise a winding of resistance wire disposed about said sleeve.

18. The device of claim 10 further comprising:

a power source; and a controller for interconnecting selected heating elements with said power source.

19. The device of claim 10 further comprising a heat sink in thermal contact with said sleeves.

20. The device of claim 19 wherein said heat sink comprises a cold plate situated below said array of sleeves.

21. The device of claim 19 wherein said heat sink comprises a cold plate situated above said array of sleeves.

22. The device of claim 19 wherein said cold plate is cooled by a Peltier device.

23. The device of claim 19 wherein said cold plate is cooled by circulating coolant.

24. The device of claim 10 further comprising a mass of thermal insulation material extending between said sleeves.

25. The device of claim 19 wherein said sleeve is thermally disconnected from said heat sink upon actuation of said heating element.

26. A device for thawing selected sample wells of a titration plate, comprising:

a support mechanism for maintaining said titration plate in a fixed position; and individual, selectively energizable heat sources, each capable of exclusively transferring heat to a single selected sample well of said titration plate fixed in position by said support mechanism, wherein said of said sample wells of a titration plate maintained in a fixed position by said support mechanism is selectively heatable without a shifting of said titration plate relative to said support mechanism.

* * * * *